(12) United States Patent
Hickerson et al.

(10) Patent No.: US 7,014,682 B2
(45) Date of Patent: Mar. 21, 2006

(54) APPARATUS AND PROCESS FOR REMOVING CONTAMINANTS FROM A FLOWING GAS STREAM

(76) Inventors: Steven A. Hickerson, 8206 Doe Ave., Visalia, CA (US) 93291; Henry L. Marschall, 15026 El Rancho Ave., Visalia, CA (US) 93292

( * ) Notice: Subject to any disclaimer, the term of this patent is extended or adjusted under 35 U.S.C. 154(b) by 0 days.

(21) Appl. No.: 10/638,059

(22) Filed: Aug. 7, 2003

(65) Prior Publication Data

US 2005/0028672 A1    Feb. 10, 2005

(51) Int. Cl.
*B01D 53/02* (2006.01)

(52) U.S. Cl. .............................. 95/92; 96/135; 96/138; 96/361; 55/315.1

(58) Field of Classification Search ............. 95/92, 95/214, 233, 273, 287; 96/134, 135, 136, 96/138, 147, 151, 361, 355; 55/315.1, DIG. 30
See application file for complete search history.

(56) References Cited

U.S. PATENT DOCUMENTS

| | | | | |
|---|---|---|---|---|
| 3,910,252 A | * | 10/1975 | Richard | 126/507 |
| 3,928,532 A | * | 12/1975 | Squires | 423/210 |
| 4,744,804 A | * | 5/1988 | Furuyama et al. | 95/111 |
| 4,828,590 A | * | 5/1989 | Eckstein et al. | 96/133 |
| 5,672,323 A | * | 9/1997 | Bhat et al. | 422/172 |
| 5,964,927 A | * | 10/1999 | Graham et al. | 96/121 |
| 6,068,659 A | * | 5/2000 | Tentarelli | 96/131 |
| 6,068,686 A | * | 5/2000 | Sorensen et al. | 96/135 |
| 6,136,057 A | * | 10/2000 | Dang et al. | 55/385.3 |
| 6,156,089 A | * | 12/2000 | Stemmer et al. | 55/467 |

* cited by examiner

*Primary Examiner*—Frank M. Lawrence
(74) *Attorney, Agent, or Firm*—Richard A. Ryan (57) ABSTRACT

An apparatus and process for removing regulated pollutants and other contaminants from a flowing gas stream between a scrubber and an exhaust stack. The apparatus comprises a vessel having a heater chamber, an adsorbent chamber and a filter chamber. The vessel inlet receives the gas stream from the scrubber and the vessel outlet discharges clean gas to the exhaust stack. A heater in the heater chamber heats the incoming gas stream to lower the relative humidity. The gas stream then passes through granular adsorbent material located in the adsorbent chamber to remove contaminants remaining after the wet scrubber. From the adsorbent chamber the gas stream flows into the filter chamber where filters remove entrained particulate matter prior to discharge to the exhaust stack. The process of the present invention includes the above-described steps.

33 Claims, 3 Drawing Sheets

APPARATUS AND PROCESS FOR REMOVING CONTAMINANTS FROM A FLOWING GAS STREAM

BACKGROUND OF THE INVENTION

1. Field of the Invention

The field of the present invention relates generally to scrubber and filter systems used to remove or reduce to acceptable levels unwanted contaminants that are present in gas emissions. More specifically, the present invention relates to apparatuses and processes for removing contaminants from a flowing gas stream as part of an air pollution control system to remove, or reduce the level of concentration of, regulated chemicals present in the flowing gases, such as effluent gases emitted from an incinerator used to incinerate waste materials.

2. Background

As is known in the art, there are many devices and processes for removing unwanted materials, such as pollutants and other contaminants, from a gas flow stream. Most of these devices and processes are designed to remove specific chemicals or families of chemicals that are either naturally part of a flowing gas stream or which arise as by-products from the treatment of other materials, such as the effluent gases that result from the incineration of waste materials in an incinerator. The devices and processes in use primarily rely on the adsorption of the contaminant by an adsorbing material or by the physical separation of the contaminant from the gas by a filter. The goal of each of the known devices and processes is to remove the unwanted contaminants, which are usually regulated by one or more governmental bodies, or reduce the concentration of the contaminants in the flowing gas to a level that is acceptable for discharge directly to the environment.

One common use of devices and processes for the removal or reduction of contaminants from a flowing gas stream is in the field of effluent gas treatment, such as the treatment of effluent gases discharged from an incinerator used to incinerate waste materials. A difficultly for the various industries that rely on the incineration of wastes and the discharge of effluent gases to the atmosphere is that the governmental bodies and agencies responsible for the administration of such discharges (i.e., those having air pollution control responsibilities) are lowering the various acceptable levels of contaminants that are allowed in the gas that is discharged to the atmosphere. Although the reduced levels of contaminants allowed in discharged gases has as its goal an effort to improve overall air quality and reduce contamination of land and water, the result is that it makes it much more difficult and expensive for existing or new incineration facilities to treat the gas effluent from the incinerator.

One industry that has been specifically targeted by governmental agencies, particularly the United States Environmental Protection Agency (the "EPA") with regard to the incineration of wastes is the health care industry. As is commonly known, health care facilities, including hospitals, medical treatment centers and the like, generate a significant amount of waste materials. These materials include all types of infectious waste, human pathological waste, human blood and blood products, medical equipment and other materials contaminated with human blood, sharps, animal waste exposed to infectious agents, off-spec pharmaceuticals, chemotherapeutic drug waste and low-level radioactive wastes (collectively referred to as medical waste). The majority of the medical waste is combustible materials, such as paper, animal bedding, cardboard and plastic from containers and contaminated materials. Because of the infectious nature of the medical waste material, the waste often cannot be safely or legally discharged to surface disposal facilities, such as landfills. As a result, incineration is one of the primary methods for health care facilities to dispose of their medical waste. However, due to the fact that most hospitals and other such institutions are found in highly populated urban centers, there is justified concern regarding the level of contaminants in the gases discharged to the atmosphere from the incinerator stacks.

The EPA is the primary federal agency responsible for the regulation of gas effluent discharged from health care facility incinerators. Recently, the EPA has promulgated new regulations in response to the 1990 amendments to the Clean Air Act which lower the acceptable level of certain contaminants commonly found in gaseous effluent from medical facilities. These regulations, referred to as the New Source Performance Standards ("NSPS") for Hospital/Medical/Infectious Waste Incinerators ("HMIWI"), found at Subpart Ec of 40 CFR Part 60, enacted on Sep. 15, 1997, are applicable to health care facility incinerators constructed after Jun. 20, 1996. On Sep. 15, 1997, the EPA also promulgated Emission Guidelines for HMIWI facilities constructed on or before Jun. 20, 1996. This new rule is found at Subpart Ce of 40 CFR Part 60. Basically, the EPA rules for HMIWI facilities control the emission levels of nine regulated contaminants, namely particulate matter (PM), carbon monoxide (CO), dioxins and dibenzofurans (dioxins/furans), hydrogen chloride (HCl), sulfur dioxide ($SO_2$), oxides of nitrogen ($NO_x$), lead (Pb), cadmium (Cd), and mercury (Hg). Some of these contaminants, particularly the dioxins/furans, are considered carcinogens and at sufficient concentrations can cause toxic effects. The EPA regulations also place limits on the stack effluent opacity and the discharge of fugitive ash emissions, as well as requirements for operator training and qualifications, waste management plans and the testing and monitoring of pollutants. The standards for new sources are effective as of Mar. 16, 1998, and the emission guidelines for existing sources are effective as of Nov. 14, 1997. The EPA standards provide emission limits that are segregated by waste burning capacity (based on the number of pounds per hour) of the HMIWI facility. For any of the facilities, the cost of complying with the new EPA regulations is significant.

Since the regulated contaminates are both particulate (aggolmerates of molecules) and gaseous (individual gas molecules), the two most common systems for reducing all of them in the gas effluent discharge from incinerators used at HMIWI facilities are the dry scrubber or the wet scrubber, or combinations of the two. Dry scrubbers can comprise a system of contacting the flowing gas stream with a solid material which chemically reacts with the contaminants in the gas stream to form a compound. A common form of dry scrubbing is the baghouse system, which uses filter bags placed across the gas stream flow path inside a vessel, which operates under principles similar to a vacuum cleaner. The bags comprise porous materials such as woven or nonwoven fabrics, cellulose-based materials such as paper, synthetics, or other materials. The bags are configured to maximize their exposure to the gaseous flow stream. The bags may be coated with powdered carbon and powdered lime or sodium bicarbonate, by dispersing these materials in the flowing gas stream. Wet air scrubbers typically utilize one or more spray nozzles to spray water, neutralizing chemicals (such as an alkali solution) and/or other reactive chemicals into the gas flow stream and then may impart a swirling or coalescing action to the air stream in order to drop the liquid out after it has absorbed contaminants. Wet scrubbers normally evaporate water into the hot gases from the incinerator, which can be as high as 1400° to 2400° F., to reduce it to temperatures of 80° to 180° F., depending on the temperature and water content of the hot incinerator gas and specific scrubber design. The term "quenching" refers to this type of cooling. Many types of wet scrubbers are available, including venturi scrubbers, cyclonic scrubbers, spray-type cyclonic scrubbers, rotary atomizers, packed towers and others to remove particulates and gaseous impurities. Wet scrubbers have seen especially wide use due to their ability to remove both very fine particulates and toxic gases from the airstream discharged from a variety of sources, including infectious waste incinerators such as those used in hospitals. In addition, well designed wet scrubber systems operate at a lower temperature (i.e., 80° to 180° F.) than dry scrubber systems (i.e., 350° to 600° F.) and, therefore, condense pollutants such as organics more readily than dry systems. To achieve both benefits, some contaminant removal systems utilize a dry baghouse scrubber followed by a wet scrubber, such as a packed tower type wet scrubber to remove gaseous contaminants not removed by the baghouse. After removing the contaminants from the gas stream, both dry and wet scrubbers typically discharge the relatively clean gas to the atmosphere.

There are many other devices intended for scrubbing gaseous effluents in industry that work either mainly by molecular adsorption of the polluting substances on an adsorbing material, or by separation of particles through a filter. In certain types of devices, such as those using activated carbon, the adsorptive removal of contaminants works according to the principle of cohesive force and retention by chemisorption. However, none of these devices both adjust the humidity of the gases for the most effective adsorption by the chosen adsorbent and also capture entrained particulate dust before final discharge of the cleaned gases.

Although the presently known and available contaminant removal systems are capable of removing the EPA regulated pollutants, they may not be able to economically achieve the lower levels now required for HMIWI, particularly with regard to the maximum levels allowed for mercury, lead and dioxins/furans, and at the same time meeting the HCl emission requirements. It can be appreciated, therefore, that what is needed is an apparatus and process for efficiently removing contaminants, including the contaminants described above, from effluent stream of gas, particularly a flowing gas stream resulting from the incineration of medical and related wastes. Such an apparatus and process should be able to effectively and efficiently remove or reduce to below acceptable standards the level of all contaminants in the effluent stream.

SUMMARY OF THE INVENTION

The apparatus and process for removing contaminants from a flowing stream of the present invention solves the problems and provides the benefits identified above. That is to say, the present invention provides an apparatus and a process of treating a stream of gas to remove contaminants from the stream of gas such that the level of all regulated contaminants remaining in the flowing gas is substantially below acceptable levels. The apparatus and process of the present invention has been found to reduce the levels of contaminants in an incinerator effluent gas stream to below acceptable levels, including the NSPS for HMIWI facilities.

In the primary embodiment of the present invention, the apparatus for removing contaminants from a flowing gas stream comprises a vessel having an inlet at the first end and an outlet at the opposing second end. The inlet connects to the discharge of a flowing gas stream, such as that from a wet scrubber. The vessel has a heater chamber at the first end, a filter chamber at the second end, and an adsorbent chamber disposed between the heater chamber and the filter chamber. The gases flow through the three chambers in series, from inlet to outlet. A heater is disposed in the heater chamber, granular adsorbent material is disposed in the adsorbent chamber and one or more filters are disposed in the filter chamber. The heater should be sized and configured to heat the flowing gases by an amount sufficient to lower the relative humidity of the gas stream to a level that enables effective removal of the contaminants from the gas flow stream, based on the selection of granular adsorbent material. Enough granular adsorbent material is placed in the adsorbent chamber to effectively remove contaminant materials from the flowing gases without requiring an undue frequency of replacement. The granular adsorbent material should be selected such that it can adsorb the target contaminants present in the flowing gases.

Preferably, the apparatus of the present invention will be located at the discharge of a wet scrubber apparatus and the gas flow stream will be at a temperature of approximately 80° F. to 140° F. and have a relative humidity of approximately 100% upon exiting the wet scrubber. For activated carbon used as the granular adsorbent, the heater should be configured to raise the temperature of the gas flow stream by 20° to 40° F., which will reduce the relative humidity to 50% or less. Although activated carbon is the preferred material, the granular adsorbent material can be selected from a group consisting of activated carbon, char, diatomaceous earth, alumina, aluminosilicates, silica, and silica gel. The granular adsorbent material can be bulk granular fill material or it can be contained in individual modules. If bulk granular fill material is used, the apparatus should include one or more fill tubes at an upper end of the adsorbent chamber for placing the quantity of granular adsorbent material into the adsorbent chamber and one or more emptying tubes at a lower end of the adsorbent chamber for emptying the granular adsorbent material from the adsorbent chamber. If individual modules are used, the adsorbent chamber should have doors that allow external access to the inside of the chamber so the modules can be placed in or taken out. In the preferred embodiment, the apparatus utilizes HEPA filters as the filters located in the filter chamber, and one or more pre-filters are disposed between the HEPA filters and the granular adsorbent material, to remove entrained particulate matter that may be picked up by the gases flowing through the granular adsorbent. The vessel also has one or more filter chamber doors for external access to the filter chamber to allow the user to remove and replace the filters as necessary. The outlet of the vessel is connected to an exhaust stack for discharge of the flowing gas stream to the atmosphere. Alternatively, a combination carbon laden HEPA filter can be utilized.

The process for removing contaminants of the present invention comprises the steps of providing a flowing gas stream having one or more contaminants, heating the stream to a sufficient temperature to reduce its relative humidity, passing it through a quantity of granular adsorbent material, adsorbing at least a portion of the one or more contaminants from it onto the granular adsorbent material, passing it through one or more filters to remove at least a portion of any remaining contaminants and/or entrained absorbent from the flowing gas stream, and discharging the flowing gas stream to the atmosphere. In the preferred embodiment, the process includes receiving a flowing gas stream discharged from a wet scrubber and having a temperature of approximately 80° to 140° F. and a relative humidity of approximately 100% and the step of heating the flowing gas to reduce the relative humidity of the flowing gas to between 30% and 50%.

Accordingly, the primary objective of the present invention is to provide an apparatus and process for removing contaminants from a flowing gas stream that utilizes a combination of heating the flowing gas stream and passing it through granular adsorbent material and filters to remove the contaminants or reduce the concentration of such contaminants to levels below that which is allowable.

It is also an important objective of the present invention to provide an apparatus for removing contaminants from a flowing gas stream having the features generally described above and more specifically described below in the detailed description.

It is also an important objective of the present invention to provide an apparatus adaptable for receiving the flowing gas discharge from a wet scrubber to further reduce the concentration of contaminants in the flowing gases.

It is also an important objective of the present invention to provide an apparatus that utilizes a vessel having an inlet and an opposing outlet with a heater chamber having a heater therein at the inlet, a filter chamber having one or more filters at the outlet and a adsorbent chamber between the heater chamber and the filter chamber with fluid flow through all three chambers in series from inlet to outlet, which connects to an exhaust stack for discharge to the atmosphere.

Yet another important objective of the present invention is to provide a process for removing contaminants from a flowing gas stream that receives the flowing gas stream having contaminants therein and raises the temperature of the flowing gas to reduce its relative humidity prior to passing the flowing gas through an adsorbent chamber having adsorbent materials therein to adsorb the contaminants and one or more filters in a filter chamber to remove fugitive particulates prior to discharging the gas to the atmosphere.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
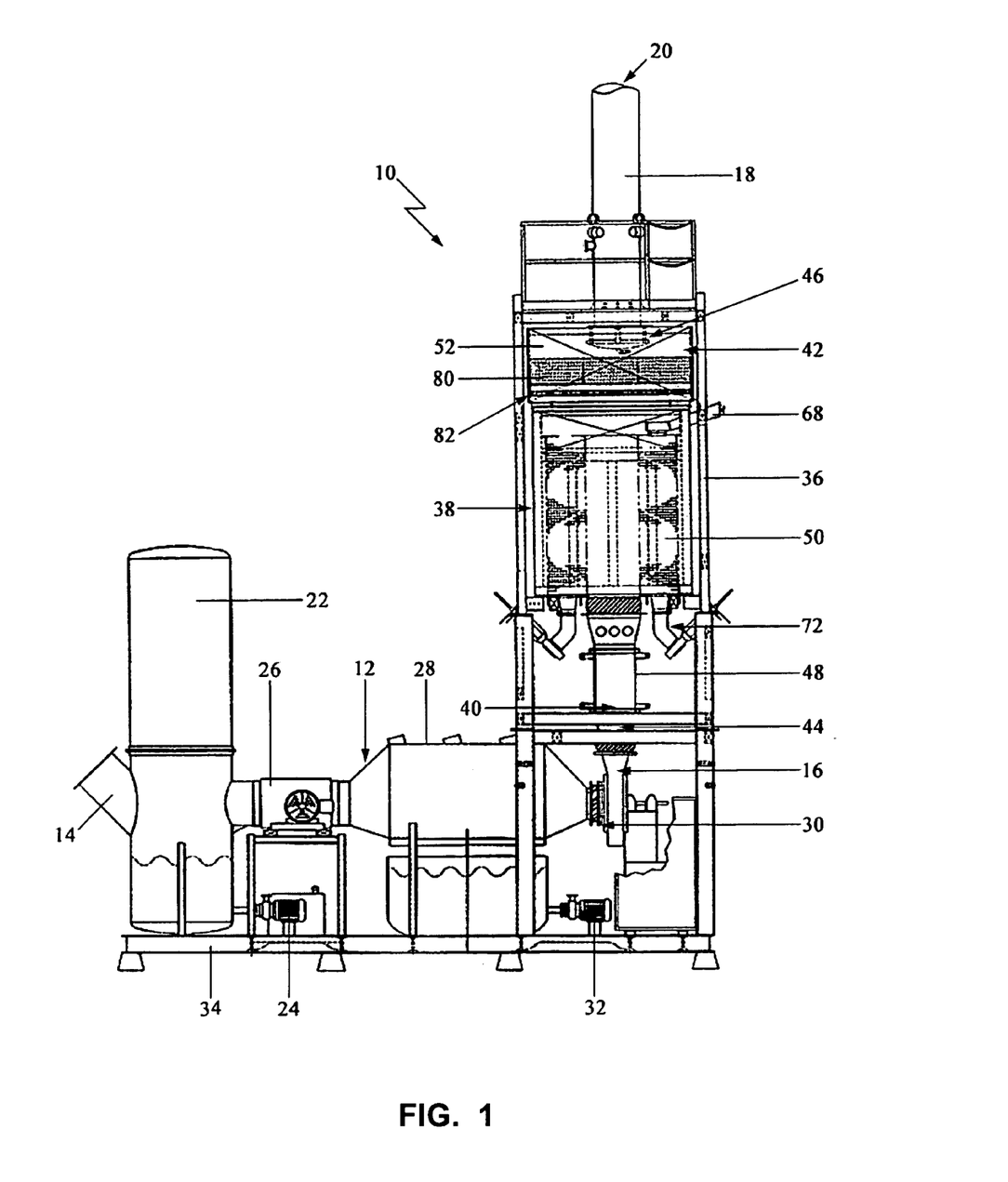
FIG. 1 is a side view of the present invention in conjunction with a wet scrubber unit.

With reference to the figures where like elements have been given like numerical designations to facilitate the reader's understanding of the present invention, and particularly with reference to the preferred embodiment of the apparatus of the present invention illustrated in FIGS. 1 through 3, the preferred embodiments of the present invention are set forth below. Referring to the drawings, and more particularly to FIG. 1, the filter apparatus, designated generally as 10, constructed in accordance with the present invention is configured to remove contaminants from a stream of waste gas flow produced by an incinerator (not shown) after passing through wet scrubber 12. The incinerator can be any typical enclosed furnace for burning or incinerating materials, such as hospital medical wastes and the like, having a means for placing these materials in the incinerator (not shown) and an ash discharge (not shown) and an exhaust gas discharge (not shown) for discharging the hot effluent gases through first conduit 14 to wet scrubber 12. In some systems a separate quench tank (not shown), for cooling the hot gases by evaporation, would be disposed between the incinerator discharge and first conduit 14 to the wet scrubber 12. The apparatus 10 can be used with any type of wet scrubber, such as that shown as 12 in FIG. 1, that discharges the gas flow stream through a discharge conduit 16. In the typical gas effluent treatment system (lacking the apparatus of this invention), discharge conduit 16 would connect to and discharge the cooled gases to exhaust stack 18 for discharge of the treated gas stream to the atmosphere. Typically the discharge outlet 20 of stack 18 would be located above the top of the roof a sufficient distance to permit dispersal of the discharged gases.

Although any type of wet scrubber 12 can be utilized with the apparatus 10 of the present invention, the wet scrubber 12 shown in FIG. 1 has been found to be particularly suited for use with the present invention. The wet scrubber 12 shown in FIG. 1 comprises a condenser tank 22, having a condenser pump 24 for recirculation spray inside the condenser, that discharges the effluent gas stream to a rotary atomizer 26, which in turn discharges the gas stream to a vessel 28 having a set of mist eliminators prior to exiting the wet scrubber 12 at discharge duct 16. An induced draft fan 30 pulls the effluent gas stream through the wet scrubber 12. An atomizer pump 32 provides the liquid for rotary atomizer 26. As shown in FIG. 1, the wet scrubber 12 is typically mounted on skid 34 or other type of frame for ease in transport to and set-up at the facility site. Although fan 30 is shown between wet scrubber 12 and apparatus 10, the entire process could be under induced draft or forced draft. Electronic controls (not shown) can be configured to automate the system.

The flowing gas stream originating from the incinerator can comprise a variety of contaminants, including those that are noxious, unhealthy or toxic, that result from the incineration of different types of materials, particularly waste materials. As described above, health care facilities incinerate materials that result in the production of contaminants that are carried in the gas flow stream. These contaminants can include a variety of heavy metals, dioxin and furan isomers, hydrogen chloride, sulfur dioxide, and other toxic substances that are formed during the incineration of medical wastes. For example, combustion of polyvinyl chloride and polyvinylidine chloride produces hydrogen chloride and may produce compounds generically known as dioxin, a significant hazard to the environment. Although the apparatus 10 of the present invention is designed and configured to remove the regulated chemicals described with regard to HMIWI facilities, the invention is not so limited. As is known in the art, the apparatus 10 and process for removing contaminants from a gas flow stream described herein can be used to remove a variety of chemical constituents, including contaminants, from a variety of gas flow streams, not limited to those that are discharged from an incinerator. The use of HMIWI standards and regulations and the flow stream created by a medical waste incinerator is meant to be an example of application of the present invention and is not intended to limit the present invention to that single application.

As shown in FIG. 1, apparatus 10 can be used in a vertical configuration and be disposed between the discharge conduit 16 of wet scrubber 12 and emissions discharge stack 18. Apparatus 10 could also be adapted for use in a horizontal configuration. In the configuration shown in FIG. 1, an upright frame 36 connects to skid 34 to support the filter apparatus 10 of the present invention. As with skid 34, upright frame 36 also reduces the cost of transporting and setting-up apparatus 10. Apparatus 10 comprises a vessel 38 that can be made out of corrosion-resistant alloy, such as type 316L stainless steel, alloy AL6XN, or other metallic or non-metallic materials, suitable for withstanding the temperature, pressure and corrosivity of the gases flowing within vessel 38. Vessel 38 has a first end 40 and opposing second end 42. In FIGS. 1, 2 and 3, first end 40 is the lower end and second end 42 is the upper end, however, if vessel 38 was horizontal or configured otherwise the ends 40 and 42 would not necessarily represent the lower or upper ends of vessel 38. At first end 40 of vessel 38 is vessel inlet 44 that connects to discharge conduit 16. At the second end 42 of vessel 38 is vessel outlet 46 that connects to exhaust stack 18. The gas flow stream from the incinerator flows through wet scrubber 12 and into inlet 44, through vessel 38 to exit through outlet 46 so that it may be discharged to the atmosphere at discharge outlet 20 at the uppermost end of exhaust stack 18.

Figure 2:
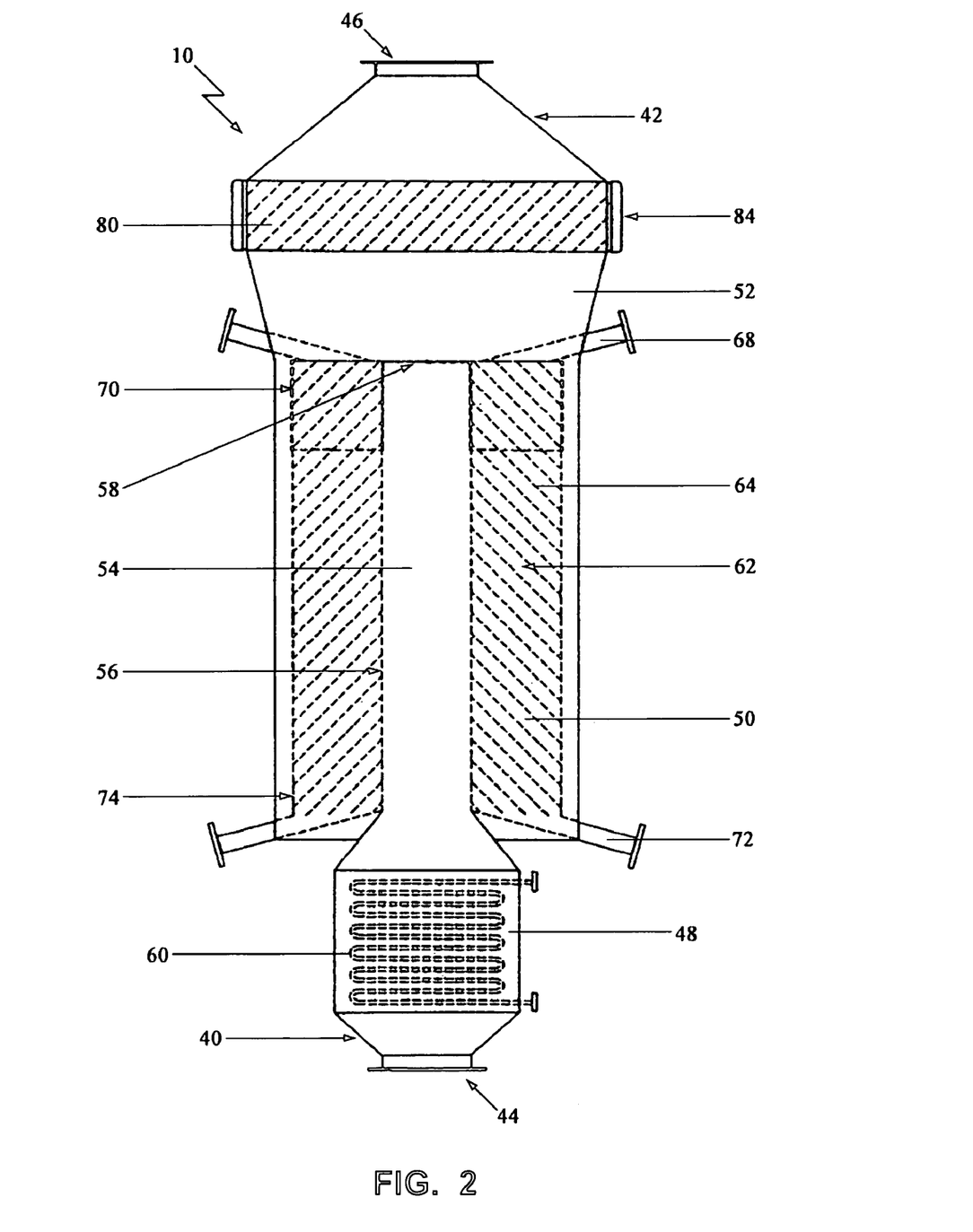
FIG. 2 is a side view of one embodiment of the present invention that utilizes granular fill adsorbent material.
Figure 3:
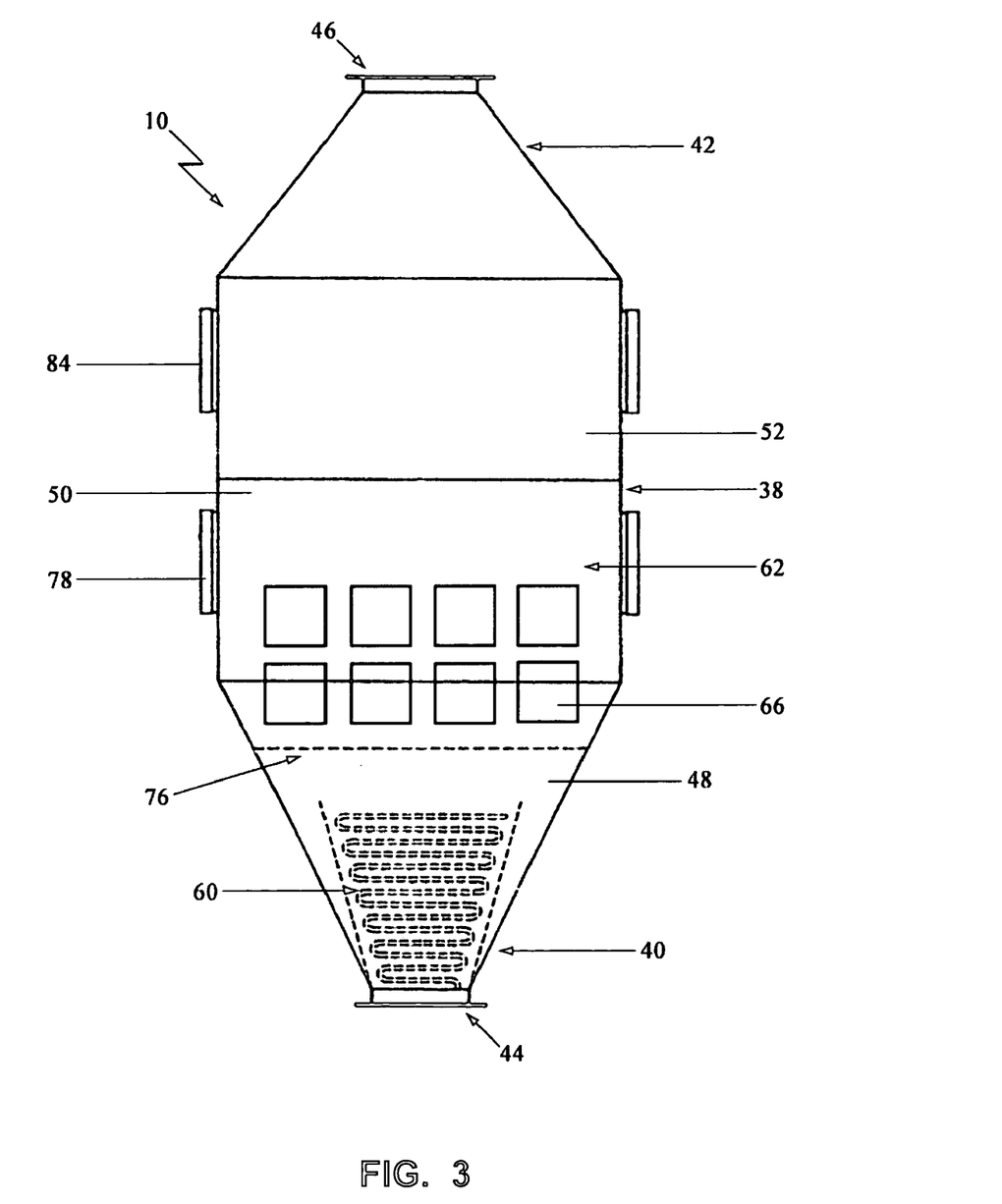
FIG. 3 is a side view of another embodiment of the present invention that utilizes modules of granular adsorbent material.

As best shown in FIGS. 2 and 3, vessel 38 of the preferred embodiment comprises three interconnecting chambers that are disposed between first end 40 and second end 42, the heater chamber 48, adsorbent chamber 50 and filter chamber 52. Heater chamber 48 is at first end 40 to interconnect with vessel inlet 44 so that the gas flow stream flows through heater chamber 48 upon or soon after entering apparatus 10 of the present invention. Filter chamber 52 is at second end 42 to interconnect with vessel outlet 46 so that the gas flow stream exits vessel 38 to exhaust stack 18 after passing through filter chamber 52. Adsorbent chamber 50 is disposed between heater chamber 48 and filter chamber 52. In the embodiment shown in FIG. 2, which utilizes granular adsorbent materials, inside vessel 38 is a central passage 54 that is formed by the interior wall 56 of adsorbent chamber 50. The interior wall 56 is perforated, slotted or otherwise open to gas flow-through adsorbent chamber 50, utilizing screens or other devices to prevent the materials located in the adsorbent chamber, described in more detail below, from entering central passage 54. The uppermost end 58 of central passage 54 is blocked or closed to force the gas flow stream to pass through interior wall 56 into adsorbent chamber 50. In use, the gas flow stream flows from the heater chamber 48 to the central passage 54 and through interior wall 56 into adsorbent chamber 50, from which it flows to filter chamber 52. As set forth below, the embodiment shown in FIG. 3 does not utilize central passage 54.

Inside heater chamber 48 is heater 60 for heating the gas flow stream from wet scrubber 12. The typical wet scrubber discharges the gas flow stream at a temperature between 80° and 180° F. and at a relative humidity of at or near 100%. Preferably, the wet scrubber would discharge the gas flow stream at a temperature below 140°, with the most preferable temperature being approximately 100° F. If necessary, an external heat sink, such as a cooling tower (not shown) or chilled water refrigeration system, should be utilized to reduce the temperature to the desired level. Higher discharge temperature makes it more difficult, and much more expensive, for heater 60 to heat up the gas flow stream a sufficient amount to lower the relative humidity of the discharged gas flow stream to approximately 50% or less to obtain proper performance of the granular adsorbent materials described below. A relative humidity that is too high can result in the granular adsorbent becoming wet and disintegrating. By raising the gas flow stream by 20° to 40° F. (preferably 30° F.), without admixing any moisture, the preferred 50% or less relative humidity can be obtained. The scrubber exhaust heater 60 can be an electric or steam heater. Heater 60 should be interlocked to fan 30 such that heater 60 does not operate unless fan 30 is operating. Heater 60 must be made out of materials suitable for the corrosivity of the gas flow stream and should include the appropriate controls to maintain the optimal temperature of the gas flow stream.

Inside adsorbent chamber 50 is absorbent material, shown generally as 62 in the accompanying figures, suitable for adsorbing the contaminants remaining in the gas flow stream after treatment by wet scrubber 12. As used herein, the term "adsorbent" means any granular solid material that is capable of adsorbing solid, liquid or gaseous substance or substances that are regarded as contaminants. Generally the adsorbent is selected so as to provide good adsorption of the targeted contaminant or contaminants. Typically the adsorbent material has surface pores or voids which increase the surface area and facilitate adsorption of the targeted contaminant or contaminants. Suitable adsorbent materials are well known in the scrubber art and include activated carbon, char, diatomaceous earth, alumina, aluminosilicates, silica and silica gel. Other solid materials can be used provided that they exhibit a sufficient surface area and pore size to be useful adsorbents. The preferred adsorbent is an activated carbon. While the adsorbent is referred to in the singular (i.e. "adsorbent" and not "adsorbents"), such is done only for convenience and it should be understood that the "adsorbent" is comprised of a plurality of granular adsorbent particles, and that these particles need not be chemically identical.

In the preferred embodiments, best shown in FIGS. 2 and 3, the particulate absorbent can comprise bulk granular activated carbon (shown as 64 in FIG. 2) or granular activated carbon in modules (shown as 66 in FIG. 3). In the preferred embodiment, the granular activated carbon 64 of FIG. 2 has carbon granules coarser than 20 mesh, most preferably 4 to 6 mesh, so the pressure drop through the granular bed 64 is reasonable (a finer particle size results in increased compactness that could result in too high a pressure drop through the adsorbent chamber). The granular activated carbon 64 is filled and emptied into the adsorbent chamber 50 either manually or by air conveying technique utilizing one or more fill tubes 68 at the upper end 70 of adsorbent chamber 50 and one or more emptying tubes 72 at the lower end 74 of adsorbent chamber 50, as shown in FIG. 2. Emptying tubes 72 should be angled downward, as shown, for ease in emptying out the granular activated carbon 64 or other particulate adsorbent material from adsorbent chamber 62. An adsorbent chamber 50 having dimensions of approximately eight feet in length and five feet in outside diameter with an eighteen inch central passage 54 requires approximately 3200 pounds of 4×6 mesh granular activated carbon 64 to fill chamber 50. Typically, the use of bulk granular absorbent shown in FIG. 2, is less expensive per pound of absorbent than the use of the modules 66 shown in FIG. 3.

The embodiment shown in FIG. 3 utilizes one or more layers of adsorbent modules 66 that are stacked inside adsorbent chamber 50. Preferably, the adsorbent modules 66 contain activated carbon inside sealed, factory packed containers that are suitable for allowing the flowing gas stream to pass through the modules 66 so that the activated carbon inside may interact with and remove the contaminants in the flowing gas stream. Typically, the modules 66 are provided in two foot by two foot packages, thereby requiring one or more layers of nine modules 66 to fill a six foot square adsorbent chamber 50. The floor of the adsorbent chamber 50 should comprise an exhaust diffuser plate 76 that diffuses the flow stream throughout the layers of activated carbon modules 66. To allow placement and removal of the modules 66, the embodiment of FIG. 3 should have one or more adsorbent chamber doors 78 that open to the interior of adsorbent chamber 50. The doors 78 should be sized and configured to allow full access to the interior of chamber 50 so that the modules 66 may be placed therein, and removed for replacement.

Inside filter chamber 52 is located one or more layers of filters 80. The preferred filter is a high efficiency particle arrestor (HEPA) filter having a 90% to 99.99% retention (as measured by D.O.P. test). The HEPA filters can be provided in filter modules far ease of installation and removal. HEPA filters are available in different levels of retention capability, with the higher retention percentages generally costing somewhat more than filters with a lower retention capability. To reduce the exposure of the HEPA filters to coarse particulates in the gas stream, the preferred embodiment of the present invention 10 utilizes one or more layers of inexpensive pre-filters 82, shown best in FIG. 1. The pre-filters 82 are thinner (2 inch thick) than HEPA filters (12 inch thick) and are capable of removing approximately 70% of entrained particulate material. The primary function of the pre-filters 82 and filters 80 is to capture any fugitive dust, such as carbon dust, that arises from passage of the gas stream through the adsorbent, such as activated carbon in granular form 64 or in modular form 66, in the adsorbent chamber 50. If not captured, the fugitive dust would be measured as regulated particulate matter (PM), contrary to pollution control objectives. Vessel 38 should also include filter chamber doors 84 to allow access to the inside of filter chamber 52 to remove and replace the filters 80 or pre-filters 82 as needed. Filter chamber doors 84 should allow access to the interior of filter chamber 52 from the outside of vessel 38.

In use, a flowing gas having one or more contaminants is conveyed to the vessel inlet 44 of vessel 38 and transported across heater 60 in heater chamber 48 for heating the flowing gas stream a sufficient temperature to reduce the relative humidity of the flowing gas prior to passing the flowing gas through a quantity of adsorbent material 62. The heater 60 should heat the flowing gas by an amount sufficient to lower the relative humidity of the flowing gas an amount appropriate for the adsorbent material 62 to effectively adsorb contaminants from the flowing gas. After the adsorbent material 62 adsorbs a portion, if not all, of the contaminants from the flowing gas, the flowing gas passes through one or more filters 80 to remove at least a portion of any remaining contaminants, including any fugitive particulates that result from the gas flowing through adsorbent material 62. After passing through the filter 80, the gas stream is discharged to the atmosphere.

In the preferred embodiment, the gas stream is received from a wet scrubber 12 that discharges the gas at a temperature range of 80° F. to 140° F. and having a relative humidity of approximately 100%. If activated carbon is used, the heater 60 should heat the gas stream a sufficient amount (i.e., 20° to 40° F.) to lower the relative humidity to 50% or less so that the activated carbon will be most effective. It has been found that, at a gas flow rate of 5000 acfm and discharge temperature of 100° F., a 40 kw electric heater or a 137,000 BTU/hr steam heater can sufficiently heat the gas stream an amount to lower the relative humidity to 50%. Too high a relative humidity can result in condensation of water in the carbon and cause the carbon particles to disintegrate. Although the preferred granular adsorbent material 62 is activated carbon, other materials (such as char, diatomaceous earth, alumina, aluminosilicates, and silica) can also be used. The adsorbent material 62 can be used in either bulk granular form 64 or contained within modules 66. The filter 80 is preferably a HEPA filter. The preferred embodiment also passes the gas stream through one or more pre-filters 82 prior to filter 80 so as to extend the life of filter 80 and improve its filtering efficiency.

In tests of the apparatus 10 of the present invention, the results obtained were much better than other known techniques of removing contaminants from a flowing gas stream. The resulting discharge to the atmosphere had contaminant levels much lower than the maximum allowed by the EPA. Because the exhaust gases leaving the exhaust stack 18 through discharge outlet 20 were at 50% or less relative humidity, the apparatus 10 produced an essentially invisible vapor plume, which reduces the likelihood of public attention and concern to the use of the incinerator. In addition, the cost of maintaining the system should be much less than dry systems which can have serious corrosion problems when subject to intermittent operation, as is typical at hospitals. In a HMIWI facility in which the embodiment of FIG. 2 of the present invention 10 was installed, the resulting measured exhaust showed a vast improvement due to the apparatus 10. The table below summarizes these results:

| Sample location All Data at 7% $O^2$ | Incinerator Oulet | Boiler Outlet | Scrubber Outlet | Stack Emissions | EPA Allowable |
|---|---|---|---|---|---|
| Total suspended PM (gr/dscf) | 0.093 | 0.081 | 0.031 | 0.002 | 0.015 |
| HCL (ppm) | 666.6 | 1067.6 | <0.1 | <0.1 | 15 |
| SO2 (ppm) | 1.7 | 1.6 | 1.2 | 0.8 | 55 |
| NOX (ppm) | 93.2 | 93.4 | 81.7 | 49.8 | 250 |
| CO (ppm) | 20.0 | X | X | X | 40 |
| Lead (mg/dscm) | 0.6341 | 0.4470 | 0.0122 | <0.0003 | 0.07 |
| Cadmium (mg/dscm) | 0.1826 | 0.2311 | 0.0025 | <0.0001 | 0.04 |
| Mercury (mg/dscm) | 0.0303 | 0.0677 | <0.0026 | <0.0016 | 0.55 |
| Dioxins/Furans (ng/dscm) Total | 131.5 | 168.4 | 5.5 | 0.3 | 25 |
| Visible Opacity (%) | X | X | X | 0 | 5 |

X—Not measured or available

The above table illustrates the improvement that can be obtained with the apparatus and process of the present invention. The test facility processed medical wastes and low-level radioactive wastes generated by a university and associated teaching hospital. A rotary atomizing wet scrubber 12 discharged the flowing gas to the apparatus 10.

In an alternative embodiment of the present invention, one or more of chambers 48, 50 and 52 are combined. For instance, filter chamber 52 and adsorbent chamber 50 can be combined with a carbon laden filter positioned therein to both adsorb and separate contaminants from the gas flow stream.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. An apparatus for removing one or more contaminants from a flowing gas stream, comprising:
   a vessel having a first end and an opposing second end, said first end having an inlet and said second end having an outlet, said vessel further comprising a heater chamber at said first end, a filter chamber at said second end and an adsorbent chamber disposed between said heater chamber and said filter chamber, wherein the gas stream flows through said heater chamber, said absorbent chamber and said filter chamber in sequence;
   a heater disposed in said heater chamber, said heater sized and configured to heat the gas stream and lower the relative humidity of said gas stream;
   a quantity of adsorbent material in said adsorbent chamber for adsorbing the contaminants in the gas stream; and
   one or more filters in said filter chamber, said one or more filters comprising a HEPA filter.

2. The apparatus according to claim 1, wherein the gas stream is discharged from a wet scrubber and said inlet is connected to said wet scrubber.

3. The apparatus according to claim 2, wherein the gas stream is at a temperature of approximately 80° F. to 140° F., and at a relative humidity of approximately 100%, said heater sized and configured to lower the relative humidity of said gas stream to between 30% and 70%.

4. The apparatus according to claim 1, wherein said outlet of said vessel is connected to an exhaust stack for discharge of the gas stream to the atmosphere.

5. The apparatus according to claim 1 further comprising one or more closeable fill openings at an upper end of said adsorbent chamber for placing said quantity of adsorbent material into said adsorbent chamber, and one or more closeable emptying openings at a lower end of said adsorbent chamber for emptying said adsorbent material from said adsorbent chamber.

6. The apparatus according to claim 1, wherein said adsorbent material is selected from the group consisting of activated carbon, char, diatomaceous earth, alumina, aluminosilicates, and silica.

7. The apparatus according to claim 6, wherein said adsorbent material is bulk granular fill material.

8. The apparatus according to claim 6, wherein said adsorbent material is in granular form contained within modules.

9. The apparatus according to claim 1, wherein said vessel has one or more filter chamber doors for access to said filter chamber.

10. The apparatus according to claim 1, wherein said vessel has one or more adsorbent chamber doors for access to said adsorbent chamber.

11. The apparatus according to claim 1 further comprising one or more pre-filters disposed between said one or more filters and said adsorbent material.

12. An apparatus for removing one or more contaminants from a flowing gas stream discharged from a wet scrubber, comprising:
   a vessel having a first end and an opposing second end, said first end having an inlet connected to said wet scrubber and said second end having an outlet, said vessel further comprising a heater chamber at said first end, a filter chamber at said second end and an adsorbent chamber disposed between said heater chamber and said filter chamber, wherein the gas stream flows through said heater chamber, said absorbent chamber and said filter chamber in sequence;
   a heater disposed in said heater chamber, said heater sized and configured to heat the gas stream and lower the relative humidity of said gas stream;
   a quantity of adsorbent material in said adsorbent chamber for adsorbing the contaminants in the gas stream; and
   one or more filters in said filter chamber.

13. The apparatus according to claim 12 further comprising one or more pre-filters disposed between said one or more filters and said quantity of adsorbent material.

14. The apparatus according to claim 12 further comprising one or more closeable fill openings at an upper end of said adsorbent chamber for placing said quantity of adsorbent material into said adsorbent chamber and one or more closeable emptying openings at a lower end of said adsorbent chamber for emptying said adsorbent material from said adsorbent chamber.

15. The apparatus according to claim 12, wherein said adsorbent material is selected from the group consisting of activated carbon, char, diatomaceous earth, alumina, aluminosilicates, and silica.

16. The apparatus according to claim 15, wherein said adsorbent material is bulk granular fill material.

17. The apparatus according to claim 15, wherein said adsorbent material is in granular form contained within modules.

18. The apparatus according to claim 12, wherein said vessel has one or more filter chamber doors for access to said filter chamber.

19. The apparatus according to claim 12, wherein said vessel has one or more adsorbent chamber doors for access to said adsorbent chamber.

20. The apparatus according to claim 12, wherein the gas stream is at a temperature of approximately 80° F. to 140° F., and at a relative humidity of approximately 100%, said heater sized and configured to lower the relative humidity of said gas stream to between 30% and 70%.

21. The apparatus according to claim 12, wherein the initial hydrogen chloride gas content of the gas stream has first been brought below the regulatory maximum by chemical and physical processes occurring within the wet scrubber.

22. A process for removing contaminants, comprising the steps of:
   a) providing a flowing gas stream discharged from a wet scrubber, said flowing gas stream having one or more contaminants therein;
   b) heating said flowing gas stream a sufficient temperature to reduce the relative humidity of said flowing gas stream;
   c) passing said flowing gas stream through a quantity of adsorbent material;
   d) adsorbing at least a portion of said one or more contaminants from said flowing gas in said adsorbent material;
   e) passing said flowing gas stream through one or more filters to remove at least a portion of any entrained particulate material from said flowing gas stream; and
   f) discharging said flowing gas stream to the atmosphere.

23. The process according to claim 22, wherein said flowing gas stream is at a temperature of approximately 80° F. to 140° F. and a relative humidity of approximately 100%.

24. The process according to claim 22, wherein said adsorbent material is disposed in an adsorbent chamber having an upper end with one or more closeable fill openings for placing said quantity of adsorbent material into said adsorbent chamber and a lower end having one or more closeable emptying openings for emptying said absorbent material from said adsorbent chamber.

25. The process according to claim 22, wherein said step of heating said flowing gas stream reduces the relative humidity of said gas flowing gas stream to between 30% and 70%.

26. The process according to claim 25, wherein the humidity of said flowing gas stream is reduced to less than 50%.

27. The process according to claim 22, wherein said flowing gas stream is discharged to the atmosphere through an exhaust stack.

28. The process according to claim 22, wherein said adsorbent material is selected from the group consisting of activated carbon, char, diatomaceous earth, alumina, aluminosilicates, and silica.

29. The process according to claim 28, wherein said adsorbent material is bulk granular fill material.

30. The process according to claim 27, wherein said adsorbent material is in granular form contained within modules.

31. The process according to claim 22, wherein said one or more filters comprise a HEPA filter.

32. The process according to claim 22 further comprising the step of passing said flowing gas stream through one or more pre-filters disposed between said one or more filters and said adsorbent material.

33. The process according to claim 22, wherein the initial hydrogen chloride gas content of said flowing gas stream has been brought below the regulatory maximum by chemical and physical processes occurring within the wet scrubber.

* * * * *